United States Patent [19]

Chou et al.

[11] Patent Number: 5,281,337
[45] Date of Patent: * Jan. 25, 1994

[54] MEMBRANE SEPARATION PROCESS

[75] Inventors: Kechia J. Chou, Wappingers Falls; Kathleen M. Hellmuth, Hopewell Junction, both of N.Y.

[73] Assignee: Texaco Inc., White Plains, N.Y.

[*] Notice: The portion of the term of this patent subsequent to Sep. 1, 2009 has been disclaimed.

[21] Appl. No.: 912,366

[22] Filed: Jul. 13, 1992

Related U.S. Application Data

[63] Continuation of Ser. No. 720,333, Jun. 25, 1991, Pat. No. 5,143,620.

[51] Int. Cl.⁵ .............................................. B01D 71/42
[52] U.S. Cl. .............................. 210/654; 210/500.37; 210/500.43
[58] Field of Search ................... 210/500.39, 634, 644, 210/649–654, 500.43, 500.37

[56] References Cited

U.S. PATENT DOCUMENTS 5,087,367  2/1972  Tsuyumoto et al. ........... 210/500.39

FOREIGN PATENT DOCUMENTS 8905182  6/1989  PCT Int'l Appl. .

Primary Examiner—Frank Sever
Attorney, Agent, or Firm—James J. O'Loughlin; Carl G. Seutter

[57] ABSTRACT

Membrane separation process is improved by use, as a support membrane, of (i) a polyacrylonitrile membrane on which at least a portion of the surface —CN groups have been hydrolyzed to —COOH groups or (ii) a membrane formed of polyacrylonitrile and polyacrylic acid.

4 Claims, No Drawings

MEMBRANE SEPARATION PROCESS

This is a continuation of application Ser. No. 07/720,333, filed Jun. 25, 1991, now U.S. Pat. No. 5,143,620.

RELATED APPLICATION

Application Ser. NO. 07/425,156, filed Oct. 23, 1989 by Texaco Inc. as assignee of Craig R. Bartels, now U.S. Pat. No. 4,992,176 issued Feb. 12, 1991.

FIELD OF THE INVENTION

This invention relates to a membrane separation process. More particularly it relates to a membrane system characterized by its improved life when used to separate charge systems typified by aqueous mixtures of ethylene glycol or isopropanol.

BACKGROUND OF THE INVENTION

As is well known to those skilled in the art, it is possible to separate mixtures of liquids, typified by mixtures of water and organic liquids such as aqueous solutions of ethylene glycol or isopropanol, by various techniques including adsorption or distillation. These conventional processes, particularly distillation, are however, characterized by high capital cost. In the case of distillation for example, the process requires expensive distillation towers, heaters, heat exchangers (reboilers, condensers, etc.), together with a substantial amount of auxiliary equipment typified by pumps, collection vessels, vacuum generating equipment, etc.

Such operations are also characterized by high operating costs principally costs of heating and cooling - plus pumping, etc.

Furthermore the properties of the materials being separated, as is evidenced by the distillation curves, may be such that a large number of plates may be required, etc. When the material forms an azeotrope with water, additional problems may be present which for example, would require that separation be effected in a series of steps (e.g. as in two towers) or by addition of extraneous materials to the system.

There are also comparable problems which are unique to adsorption systems.

It has been found to be possible to utilize membrane systems to separate mixtures of miscible liquids by pervaporation. In this process, the charge liquid is brought into contact with a membrane film; and one component of the charge liquid preferentially permeates the membrane. The permeate is then removed as a vapor from the downstream side of the film - typically by sweeping with a carrier gas or by reducing the pressure below the saturated vapor pressure of the permeating species.

Illustrative membranes which have been employed in prior art techniques include those set forth in the following table:

TABLE

| Separating Layer | References |
| --- | --- |
| Nafion brand of perfluorosulfonic acid | Cabasso and Liu J. Memb. Sci. 24, 101 (1985) |
| Sulfonated polyethylene | Cabasso, Korngold & Liu J. Pol. Sc: Letters, 23, 57 (1985) |
| Fluorinated polyether or Carboxylic Acid fluorides | U.S. Pat. No. 4,526,948 to Dupont as assignee of Resnickto |
| Selemion AMV brand of Asahi Glass cross-linked styrene butadiene (with quaternary ammonium residues on a polyvinyl chloride backing) | Wentzlaff Boddeker & Hattanbach J. Memb. Sci. 22, 333 (1985) |
| Cellulose triacetate | Wentzlaff, Boddeker & Hattanback, J. Memb. Sci. 22, 333 (1985) |
| Polyacrylonitrile | Neel, Aptel & Clement Desalination 53, 297 (1985) |
| Crosslinked Polyvinyl Alcohol | Eur. Patent 0 096 339 to GFT as assignee of Bruschke |
| Poly(maleimide-acrylonitrile) | Yoshikawa et al J. Pol. Sci. 22, 2159 (1984) |
| Dextrine - isophorone diisocyanate | Chem. Econ. Eng. Rev., 17, 34 (1985) |

The cost effectiveness of a membrane is determined by the selectivity and productivity. Of the membranes commercially available, an illustrative polyvinyl alcohol membrane of high performance is that disclosed in European patent 0 096 339 A2 of GFT as assignee of Bruschke— published 21 Dec. 1983.

European Patent 0 096 339 A2 to GFT as assignee of Bruschke discloses, as cross-linking agents, diacids (typified by maleic acid or fumaric acid); dihalogen compounds (typified by dichloroacetone or 1,3-dichloroisopropanol); aldehydes, including dialdehydes, typified by formaldehyde. These membranes are said to be particularly effective for dehydration of aqueous solutions of ethanol or isopropanol.

This reference discloses separation of water from alcohols, ethers, ketones, aldehydes, or acids by use of composite membranes. Specifically the composite includes (i) a backing typically about 120 microns in thickness, on which is positioned (ii) a microporous support layer of a polysulfone or a polyacrylonitrile of about 50 microns thickness, on which is positioned (iii) a separating layer of cross-linked polyvinyl alcohol about 2 microns in thickness.

Polyvinyl alcohol may be cross-linked by use of difunctional agents which react with the hydroxyl group of the polyvinyl alcohol. Typical cross-linking agent may include dialdehydes (which yield acetal linkages), diacids or diacid halides (which yield ester linkages), dihalogen compounds or epichlorhydrin (which yield ether linkages) olefinic aldehydes (which yield ether/acetal linkages), boric acid (which yields boric ester linkages), sulfonamidoaldehydes, etc.

U.S. Pat. No. 4,992,176 which issued Feb. 12, 1991 to Texaco as assignee of Craig R. Bartels is directed to separation of water from organic oxygenates, such as isopropanol, by use of a membrane system including a support layer of polyacrylonitrile bearing a separating layer of poly(vinyl pyridine) which has been cross-linked with an aliphatic polyhalide.

U.S. Pat. No. 4,728,429 to Cabasso et al, U.S. Pat. No. 4,067,805 to Chiang et al, U.S. Pat. No. 4,526,948 to Resnick, U.S. Pat. No. 3,750,735 to Chiang et al, and U.S. Pat. No. 4,690,766 to Linder et al provide additional background.

Additional prior art which may be of interest includes:

*Mobility of SD in Probes in Quaternized Poly(4-Vinyl-pridine) Membranes,* Makino, Hamada, and Iijima, in Polym. J. (Toyko), 19(6), 737–45, 1987.

*Effect of Quaternization on the Pervaporation Rate of Water Through Poly(4-Vinylipyridine) Membrane,* Hamayal and Yamada, in Kobunshi Ronbunshu, 34(7), 545–7, 1977.

*Preparation of Separation Membranes,* Yamamoto, Toi, and Mishima, patent #JP 61/161109 A2, Jul. 21 1986. (Japanese).

*Separation of Some Aqueous Amine Solutions by Pervaporation through Poly(4-Vinylpyridine) Membrane* Yamada and Hamaya, in Kobunshi Ronbunshu, 39(6), 407–14, 1982.

*Complex Formation of Cross-linked Poly(4-Vinyl-pyridine) Resins with Copper (II),* by Nishide, Deguchi, and Tsuchida, in Bulletin of the Chemical Society of Japan, Vol. 49(12), 3498-3501 (1976).

Although many of these membrane systems of the prior art may exhibit satisfactory Flux and Separation, it is found in practice that after the membrane assembly has been in use to effect a particular separation or for an extended period of time, the assembly may tend to deteriorate and become brittle. In the membrane assembly of the above-noted U.S. Pat. No. 4,992,176 for example, it is found that mechanical stability deteriorates to a degree that the Separation undesirable decreases. Although the length of time to reach this undesirable state with may vary depending on the nature of the charge and the conditions of operation, it may occur in less than a few hours or in a few days.

Inspection of the membrane system reveals that deterioration is due to the failure of the adhesion between the separating layer and the support layer. In the case for example of a polyvinyl pyridine separating membrane layer mounted on a polyacrylonitrile support, it is found that the bond therebetween has failed and this is evidenced by the visible separation of the layers as well as by the cracking of the separating membrane layer at those points at which the bond has failed.

It is an object of this invention to provide a membrane system, characterized inter alia by its ability to separate water from an organic oxygenate typified by ethylene glycol, which possesses a high degree of mechanical stability during such separation operations. Other objects will be apparent to those skilled in the art.

STATEMENT OF THE INVENTION

In accordance with certain of its aspects, this invention is directed to a membrane support layer, characterized by its high degree of bonding ability to a membrane separating layer, comprising a membrane of a carbon-carbon backbone polymer containing —CN groups and a surface thereof bearing —COOH groups.

DESCRIPTION OF THE INVENTION

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, non-woven or woven fibrous polyester.

One typical non-woven polyester carrier layer may be formulated of non-woven, thermally-bonded strands and characterized by a fabric weight of 80±8 grams per square yard, a thickness of 4.2±0.5 mils, a tensile strength (in the machine direction) of 31 psi and (in cross direction) of 10 psi, and a Frazier air permeability of 6 cuft/min/sq. ft. @0.5 inches of water.

THE POROUS SUPPORT LAYER

The porous support layer of this invention is preferably formed of a membrane of a carbon-carbon backbone polymer containing —CN groups and a surface thereof bearing pendant carboxyl (—COOH) groups. This layer may be formed of polyacrylonitrile, at least a portion of the surface —CN groups of which have been hydrolyzed to —COOH groups. Alternatively this layer may be formed by casting a mixture of a polyacrylonitrile and a polyacrylic acid.

When the porous support layer is formed from a polyacrylonitrile, the polymer may typically be of molecular weight $\overline{M}_n$ 5,000–100,000 preferably 20,000–60,000, say 40,000. It may be the cast from a 5 w %–20 w %, say 15 w % solution thereof in inert solvent (typically a solvent such as dimethyl formamide, dimethyl sulfone, or dimethyl acetamide) to form a layer of 40–80 microns, say 50 microns thick. The cast membrane is then immersed in water at 4°–5° C. to 30° wherein the solvent is extracted and the membrane sets up. Solvent such as that in which there polyacrylonitrile is dissolved, may also be added separately to the water bath to aid in membrane formation. The membrane is then rinsed with water to remove solvent.

In practice of the process of this invention according to certain of its aspects, the so-prepared porous support layer, which is formed of the carbon-carbon backbone bearing —CN groups which characterize polyacrylonitrile, is hydrolyzed to convert at least a portion of the surface —CN groups to —COOH groups.

Although it may be possible to effect hydrolysis of the polyacrylonitrile in solution prior to casting of the film or to attain the desired results by use of a mixture (in solvent) of a polyacrylonitrile and a polyacrylic acid, it is preferred to prepare the desired support by casting a polyacrylonitrile membrane and then treating the surface to effect hydrolysis of —CN to —COOH.

Hydrolysis, in this embodiment, may be effected by contacting the surface of the cured polyacrylonitrile support film with a hydrolyzing agent. Hydrolyzing agents commonly include aqueous solutions of water-soluble acids or bases, preferably Bronsted acids or bases in aqueous solution having a pH which is at least one unit distant from the neutral pH of 7 (i.e. below 6 or above 8). When the hydrolyzing agent is an acid, it is preferred that the pH of the agent be less than about 1. (Although acids of pH of 2–6 may be employed, it is found that the hydrolysis occurs slowly) . When the agent is a base, the pH of the base should be above 8, say 9–13.

Typical acids which may be used to effect hydrolysis may include the following strong (i.e. substantially completely ionized) acids:

| TABLE |
|---|
| sulfuric acid |
| hydrochloric acid |
| nitric acid |
| hydrofluoric acid |

A typical strong acid which may be employed is a 16.6 w % aqueous solution of sulfuric acid which has a pH<1.

Typical weak acids which may be used to effect hydrolysis may be the following:

TABLE

| Acid |
| --- |
| formic acid |
| oxalic acid |
| acetic acid |
| propionic acid |
| phosphoric acid (H$_3$PO$_4$) |

Typical bases which may be used to effect hydrolysis may include the following strong (i.e. substantially completely ionized) bases:

TABLE

| |
| --- |
| sodium hydroxide |
| potassium hydroxide |
| sodium carbonate |
| trisodium phosphate |

A typical strong base which may be employed is a 10 w % aqueous solution of sodium hydroxide.

Typical weal bases which may be used to effect hydrolysis may include the following:

TABLE

| Base |
| --- |
| ammonium hydroxide |
| pyridine |
| n-butyl amine |
| iso-butyl amine |
| diethyl amine |
| diphenyl amine |
| ethylene amine |

Hydrolysis may be effected by contacting the surface of the acrylonitrile porous support layer with the hydrolyzing agent at 70° C.–150° C., say 125° C. for 1–120, say 2 minutes. During this period, it may typically be found that 1–100% mole %, typically 1–40 mole %, say 15 mole % of the surface —CN groups may be hydrolyzed to —COOH groups.

In another embodiment, it may be possible to effect hydrolysis under similar conditions—prior to casting.

It should be noted that when hydrolysis is effected with a base, such as sodium hydroxide, the —CN groups may be hydrolyzed to —COONA. It is possible to convert this to the acid —COOH group by treatment with acid—but this is not necessary. In fact, slightly better results (in terms of reproducibility, Separation, and Flux) may be attained with e.g the —COONA salt-form than with the —COOH acid form.

In one of its embodiments the porous support layer may be formed from a mixture of a polyacrylonitrile and a polyacrylic acid. This may be carried out by casting a 40–80 micron, say 50 micron layer from a solution in inert solvent containing (i) 60 w %-99 w %, say 85 w % of a polyacrylonitrile of molecular weight $\overline{M}_n$ of 5,000–1000,000, preferably 20,000–60,000, say 40,000 and (ii) 1w %-40 w %, say 15 w % of a polyacrylic acid of molecular weight $\overline{M}_n$ of 90,000–300,000, preferably 200,000–250,000 say 250,000.

The so-cast porous support layer may be cured at 125° C.–225° C., say 150° C. for 1–30 minutes, say 10 minutes to yield a film having a thickness of 40–80 microns, say 50 microns.

It appears likely that when the support layer is formed from the mixture of polyacrylonitrile and polyacrylic acid and thereafter cured, an interchange reaction may occur which yields a polymer which is characterized by a carbon-carbon backbone bearing both —CN and —COOH groups—which polymer is similar to that formed by partially hydrolyzing a polyacrylonitrile polymer.

It is a feature of these several embodiments that they are characterized by the same mass properties of a polyacrylonitrile membrane (with respect e.g. to separation ability etc.) while simultaneously possessing augmented bonding properties in the membrane system because of the modified surface characteristics generated by the treatment of the instant invention.

THE SEPARATING LAYER

There is then deposited on the 40–80 micron thick so-treated support layer, the separating layer. The separating layer may be any of a wide range of membranes depending on the charge to be separated and the conditions of separation. It might for example be (i) a cross-linked polyvinyl alcohol membrane (ii) a quaternary ammonium-exchanged fluorinated ion exchanged membrane, (iii) a sulfonated polypolyethylene membrane, (iv) a silicone or silicone/polycarbonate membrane, (v) a cross-linked polyimine membrane, etc.

A preferred separating layer or membrane which permits attainment of separation in accordance with this invention includes a non-porous film of cross-linked poly(vinyl pyridine) of thickness of about 1–10 microns, preferably 1–5 microns, say 3 microns. This layer is formed (preferably by casting) from a poly(vinyl pyridine) solution. Although poly(2-vinyl pyridine) may be employed, the preferred separating layer is prepared from poly(4-vinyl pyridine)—typically the Reilline 4200 brand (of Reilly Tar and Chemical Co) of poly(4-vinyl pyridine) in a 10 w % solution in a suitable alcohol solvent such as methanol.

The separating membrane may be formed by mixing 0.5–2 parts, say 1 part of the 10%–30 %, say 10 w % solution of poly (4-vinyl pyridine) in methanol with 1 part methanol, and 0.1–0.8 parts, say 0.52 parts of aliphatic polyhalide cross-linking agent and casting the mixture on a support.

The separating layer may be a homopolymer or a copolymer of 2-vinyl pyridine or more preferably 4-vinyl pyridine. When copolymers are employed, the co-monomer may be an ethlenically unsaturated monomer, typically vinyl chloride, ethylene, vinyl alcohol, styrene, vinyl acetate, ethylene oxide, etc. In the preferred embodiment, the separating layer is a homopolymer of 4-vinyl pyridine of molecular weight $\overline{M}_v$ of 10,000–500,000, preferably 100,000–300,000, say about 200,000.

The polymer may be cross-linked with a cross-linking agent to form the membranes useful in practice of this invention.

Typically the cross-linking agents may contain an aliphatic moiety, preferably containing 2–12 carbon atoms, typically 3–6 carbon atoms, say 4 carbon atoms. Although the cross-linking agent may be a polyhalide, it typically contains 2–5 halogen atoms, most preferably 2. The halogen is preferably bromine or less preferably chlorine or iodine. The halides may preferably be alpha, omega dihalides of linear straight chain aliphatic hydrocarbon. Typical cross-linking agents may be as tabulated infra, the first listed being preferred:

TABLE

| |
|---|
| 1,4-dibromo-n-butane (DBB) |
| 1,5-dibromo-n-pentane (DBP) |
| 1,3-dibromo propane |
| 1,6-dibromo hexane |
| 1,8-dibromo octane |
| 1,4-dichloro-n-butane |

In situ cross-linking may be carried out by casting onto the preferred treated polyacrylonitrile support the poly(4-vinyl pyridine) typically in the solution in methanol to which has been added the cross-linking agent (typically 1,4-dibromobutane) in mole ratio of cross-linking agent to polymer of 0.2-2, say about 1.13.

It may be possible in one embodiment to cross-link the poly(4-vinyl pyridine) separating layer in one step by casting the solution of poly(4-vinyl pyridine) and polyhalide, followed by heat curing the cast membrane at 100° C.-200° C., say 125° C. for 1-30 minutes, say 2 minutes.

In another embodiment, it may be possible to apply to the treated porous support layer, a solution of poly(4-vinyl pyridine). This may be dried at 40° C.-80° C., say 50° C. for 2-10 minutes, say 4 minutes to form a film. There may then be added onto the surface of this un-cross-linked film a solution in methanol containing polyhalide and 2-7 w %, say 3.5 w % of poly(4-vinyl pyridine).

The composite membrane, whether prepared by the one-step or the two-step process may then be cured in an oven at 100° C.-200° C., say 125° C. for 1-30 minutes, say 2 minutes to yield a film having a thickness of 1-10 microns, say 4 microns.

THE COMPOSITE MEMBRANE

It is a feature of this invention that the composite membrane may comprise (i) an optional carrier layer, characterized by porosity and mechanical strength, for supporting a porous support layer and a separating layer, (ii) as a porous support layer a membrane having a carbon-carbon backbone containing —CN groups and a surface thereof bearing —COOH groups, of molecular weight $\overline{M}_n$ of 5,000-100,000 of thickness of 10-80 microns, and of molecular weight cut-off of 25,000-100,000, and (iii) a non-porous separating layer, preferably of poly(vinyl pyridine) of molecular weight $\overline{M}_v$ of 10,000-500,000 which has been cross-linked with an aliphatic polyhalide.

The composite membranes of this invention may be utilized in various configurations. It is, for example, possible to utilize the composite in a plate-and-frame configuration in which separating layers may be mounted on the porous support layer with the carrier layer.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There is then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. The projecting portion of the discharge channel of the bag-like unit is placed over the performations of the conduit; and the bag-like unit is wrapped around the conduit to form a spiral wound configuration.

It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell(in manner comparable to a shell-and-tube heat exchanger) provided with an inlet at one end and an outlet at the other. A baffle-like seal between the inner surface of the shell and the outer surface of the spiral-wound input prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn from the system. In this embodiment, it will be apparent that the system may not include a carrier layer.

In another embodiment, it is possible to utilize the system of this invention as a tubular or hollow fibre. In this embodiment, the porous support layer of e.g. polyacrylonitrile may be extruded as a fine tube with a wall thickness of typically 0.001-0.1 mm. The extruded tubes are passed through a aqueous bath of hydrolyzing agent, washed, and then through a bath of e.g. poly(vinyl pyridine) in n-butanol which then is cross-linked and cured. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

In this embodiment, it will be apparent that the system may not normally include a carrier layer.

PERVAPORATION

It is a feature of the membrane assembly including the membrane support layer and the non-porous separating layer mounted thereon that, although this system may be useful in various membrane processes including reverse osmosis, it is found to be particularly effective when used in a pervaporation process. In pervaporation, a charge liquid containing a more permeable and a less permeable component is maintained in contact with a non-porous separating layer; and a pressure drop is maintained across that layer. The charge liquid dissolves into the membrane and diffuses therethrough. The permeate which passes through the membrane and exits as a vapor may be recovered by condensing at low temperature or alternatively may be swept away by use of a moving stream of gas. Preferably, the permeate side of the membrane is maintained at a low pressure, typically 5 mm. Hg.

For general background on pervaporation, note U.S. Pat. No. 4,277,344; U.S. Pat. No. 4,039,440; U.S. Pat. No. 3,926,798; U.S. Pat. No. 3,950,247; U.S. Pat. No. 4,035,291; etc.

It is a feature of the process of this invention that the novel membrane may be particularly useful in pervaporation processes for dewatering aqueous mixtures of organic oxygenates. It may be possible to utilize the process of this invention to remove water from immiscible mixtures therewith as in the case of ethyl acetate (solubility in water at 15° C. of 8.5 parts per 100 parts of water). It will be apparent to those skilled in the art that it may be desirable to separate large quantities of water from partially miscible systems as by decantation prior to utilizing the process of the invention to remove the last traces of water.

The advantages of the instant invention are more apparent when the charge liquid is a single phase homogeneous aqueous solution as is the case for example with aqueous solutions of isopropanol or ethylene glycol. The system may also find use in the case of slightly soluble liquids wherein two phases are present (i) water-oxygenate first phase and, as a second phase (ii) either water or oxygenate. Clearly those charge liquids which contain only a small portion of an immiscible second liquid phase may benefit most from the process of this invention. It is also a feature of this invention that it may be particularly useful to separate azeotropes such as isopropanol-water.

It is a particular feature of this invention that use of the membrane system (preferably employing the treated - surface polyacrylonitrile support) permits attainment of separation systems which possess all the advantages attained using untreated polyarylonitrile in addition to substantially improved mechanical and chemical stability.

The charge organic oxygenates which may be treated by the process of this invention may include alcohols, glycols, weak acids, ethers, esters, ketones, aldehydes, etc. It will be apparent to those skilled in the art that the charge organic oxygenates used should be inert with respect to the separating membrane. Clearly a system wherein the membrane is attacked by the components of the charge liquid will not yield significant separation for any reasonable period of time. Best results may be achieved when treating alcohols (such as isopropanol) or glycols (such as ethylene glycol). Results achieved with acids are generally less satisfactory.

Illustrative alcohols may include ethanol, propanol, i-propanol, n-butanol, i-butanol, t-butanol, amyl alcohols, hexyl alcohols, etc.

Illustrative glycols may include ethylene glycol, propylene glycols, butylene glycol or glycol ethers such as diethylene glycol, triethylene glycol, or triols, including glycerine; etc.

Illustrative chlorinated hydrocarbons may include dichloroethane, methylene dichloride, etc.

Illustrative weak acids may include hexanoic acid, octanoic etc. (When acids are present, preferably the pH of the charge liquid should be above about 4. Typical acids which may be treated by the process of this invention include those having a $pKa \geqq ca$ 4.8.

Illustrative esters may include ethyl acetate, methyl acetate, butyl acetate, methyl benzoate, ethylene glycol mono acetate, propylene glycol monostearate, etc.

Illustrative ethers may include tetrahydroforan, diethyl ether, diisopropyl ether, etc.

Illustrative ketones may include acetone, methyl ethyl ketone, acetophenone, etc.

Illustrative aldehydes may include formaldehyde, acetaldehyde, propionaldehyde, etc.

It is believed that the advantages of this invention are most apparent where the organic oxygenate is a liquid which is infinitely miscible with water—typified by isopropyl alcohol or ethylene glycol.

A typical charge may be an aqueous solution containing 70%-95%, say 85 w % isopropanol.

In practice of the pervaporation process of this invention, the charge aqueous organic oxygenate solution typically at 40° C.-120° C., say 80° C. may be passed into contact with the non-porous separating layer of the membrane of this invention. A pressure drop of about one atmosphere is commonly maintained across the membrane. Typically, the feed or charge side of the membrane is at about atmospheric pressure and the permeate or discharge side of the membrane is at a pressure of about 2-50 preferably 5-20, say 10 mm. Hg.

The permeate which passes through the membrane includes water and a small proportion of the organic oxygenate from the charge liquid. Typically, the permeate contains 70-99.5, say 75 w % water. Permeate is recovered in vapor phase.

Performance is judged by the ability of a membrane system to give a permeate containing decreased content of organic oxygenate (from a charge containing a higher content of organic oxygenate and water) with a good flux (kilograms-meter$^2$-/hour (kmh)) at a predetermined feed temperature and with a vacuum on the permeate side and a condenser (cooled by liquid nitrogen). Compositions falling outside the scope of this invention may be characterized by unsatisfactory separation or unsatisfactory productivity (flux) or both.

Pervaporation may typically be carried out at a flux of about 0.5-2, say 1.2 kilograms per square meter per hour (kmh). Typically, the units may show good separation (measured in terms of w % organic oxygenate in the permeate during pervaporation of an aqueous solution of organic oxygenate through a poly(4-vinyl pyridine) separating layer.

It will be noted that as the concentration of the charge increases, the concentration of oxygenate in the permeate increases and the Flux decreases.

Practice of the process of this invention will be apparent to those skilled in the art from inspection of the following examples wherein, as elsewhere in this specification, all parts are parts by weight unless otherwise stated. An asterisk indicates a control example.

DESCRIPTION OF SPECIFIC EMBODIMENTS

Example I

In this Example which represents the best mode presently known of carrying out the process of this invention, the porous carrier layer employed is the DUY-L brand of non-woven polyester of the Daicel Corporation. The porous support layer is a microporous polyacrylonitrile membrane layer of molecular weight $\overline{M}_n$ of 40,000. This layer is treated with an acid which is mild enough not to decrease the mechanical stability yet strong enough to hydrolyze a portion of the acrylonitrile to the corresponding acrylic acid.

The acid hydrolyzing agent composition is prepared by mixing one part of concentrated sulfuric acid with five parts of water to yield a solution of PH of <1. This composition at 125° C. is placed in contact with the polyacrylonitrile support layer for 2 minutes. During this time, 15 mole % of the surface —CN groups are converted to —COOH groups. This is evidenced by the broad peak at 1749–1688 $cm^{-1}$ in the infra red (FTIR), which corresponds to carboxylic acid stretching. The product contains surface —CN groups and surface —COOH groups, This support is coated with poly(4-vinyl pyridine) by coating with a solution containing 2.5 parts of n-butanol, 2.5 parts of 20% poly(4-vinyl pyridine) in methanol, and 1.3 parts of 1,4-dibromobutane. This coating is dried at 125° C. for 2 minutes and cured at 125° C. for two minutes.

This membrane system is used to separate a charge liquid containing 85 w % ethylene glycol and 15 w % water. Charge is admitted to the pervaporation cell at 70° C. The permeate condenser yields an aqueous solution containing 75 w % water and only 25 w % ethylene glycol. The Flux is 0.7 kmh and the permeate contains ca 75 w % water.

After seven days of operation, the membrane was inspected. It exhibited no evidence of separation, brittleness, or cracking. The surface was as smooth as the original after one week (168 hours) operation.

Example II*

In this control Example, the procedure of Example I is duplicated except that the polyacrylonitrile is not etched or treated with the sulfuric acid solution.

On disassembly and inspection after 3 hours of operation, it is found that the poly (vinyl pyridine) separating layer is brittle and cracked; and it has mechanically separated from the polyacrylonitrile support layer.

Example III

In this Example, the procedure of Example I is carried out except that the polyacrylonitrile is etched, not with sulfuric acid, but with 40 w % aqueous sodium hydroxide solution containing low % glycerine (to provide a viscous, high boiling mixture). Analysis by FTIR showed a broad peak at 1651 $cm^{-1}$ corresponding to the carboxylic acid salt. (Rinsing the surface with low % hydrochloric acid showed a shift of the 1651 $cm^{-1}$ peak to 1700 $cm^{-1}$ which is in the region of carboxylic acid stretching.)

The resulting membrane showed Flux of 1.6 kmh and no evidence of any mechanical separation after seven days. The permeate contains 80% water.

Example IV

In this Example, the support layer is formed (as in Example I) from an aqueous solution containing 85 w % polyacrylonitrile of $\overline{M}_n$ of 40,000 and 15 w % of polyacrylic acid $\overline{M}_n$ of 250,000. The resulting membrane contains Surface —CN and surface —COOH groups.

The procedure of Example I is otherwise followed to show and no evidence of mechanical separation after seven days.

Examples V–IX

Results comparable to those of Example I may be attained if the separating membrane layer is:

TABLE

| EXAMPLE | Separating Membrane Layer |
|---|---|
| V | Polyvinyl alcohol of $\overline{M}_n$ of 115,000 cross-linked with glutaraldehyde - pervaporation |
| VI | Nafion-H 117 Fluorinated ion - exchange membrane which has been exchanged with tetra-n-octyl ammonium bromide - pervaporation |
| VII | Sulfonated polyethylene which has been contacted with LiCl - pervaporation |
| VIII | Polyethylene imine which has been cross-linked with toluene diisocyanate - reverse osmosis |
| IX | A blend of polyvinyl alcohol and polyacrylic acid - pervaporation |

Examples X–XI–XII

This procedure of Example I is followed except that the polyvinyl pyridine separating membrane is cross-linked with 1,6-dibromo hexane instead of an equal amount of 1,4-dibromobutane. In Control Example X*, the support membrane was neither acid nor base treated. In Example XI, the support membrane was etched with aqueous sulfuric acid and in Example XII, the support membrane was etched with 40% aqueous sodium hydroxide.

In Control Example X*, the barrier cracked after 3–5 hours (Flux was 0.4 kmh and Selectivity was 70%—water in permeate); but clearly since the system was leaking, this will drop to the same ratio as the feed. In Examples XI and XII (Flux 1.4 and 1.2 and Selectivity of 70–82% and 80%), the separating film is as smooth as the original after one week of operation—with no evidence of separation of the membrane layers.

Although this invention has been illustrated by reference to specific embodiments, it will be apparent to those skilled in the art that various charges and modifications may be made which clearly fall within the scope of the invention.

What is claimed is:

1. A membrane system, characterized by its ability to separate water from a charge containing water and an organic oxygenate, which comprises a membrane support layer of a polyacrylonitrile, at least a portion of the surface —CN groups of which have been hydrolyzed to carboxylate salt groups; and mounted thereon a nonporous separating elastomer membrane layer.

2. The method of treating a membrane layer of polyacrylonitrile which contains surface —CN groups which comprises hydrolyzing at least a portion of said surface —CN groups to surface carboxylate salt groups thereby forming a membrane layer containing a surface —CN groups at least a portion of which have been hydrolyzed to carboxylate salt groups;

recovering said membrane layer containing surface —CN groups at least a portion of which have been hydrolyzed to carboxylate salt groups; and forming thereon a separating membrane layer of a polymer of cross-linked polyvinyl pyridine.

3. The method of treating a charge containing water and organic oxygenate which comprises maintaining a membrane assembly including (i) a porous support layer of a polyacrylonitrile, at least a portion of the surface —CN groups of which have been hydrolyzed to carboxylate salt groups and (ii) a separating elastomer membrane mounted on and bonded to said porous support layer;

maintaining a pressure drop across said non-porous separating elastomer membrane;

passing a charge aqueous solution of an organic oxygenate into contact with the high pressure side of said non-porous separating elastomer membrane whereby at least a portion of said water in said charge aqueous solution and a lesser portion of organic oxygenate in said charge aqueous solution pass by pervaporation through said non-porous separating elastomer as a lean mixture containing more water and less organic oxygenate than are present in said charge aqueous solution and said charge aqueous solution is converted to a rich liquid containing less water and more organic oxygenate than are present in said charge aqueous solution;

recovering as permeate from the low pressure side of said non-porous elastomer membrane, said lean mixture containing more water and less organic oxygenate than are present in said charge aqueous solution, said lean mixture being recovered in vapor phase at a pressure below the vapor pressure thereof; and recovering as retentate from the high pressure side of said non-porous separating membrane said rich liquid containing a lower water content and a higher organic oxygenate content than are present in said charge aqueous solution.

4. The method of claim 3 wherein said carboxylate salt is a sodium salt.

* * * * *